United States Patent [19]

Strand

[11] Patent Number: 4,592,248
[45] Date of Patent: Jun. 3, 1986

[54] QUICK CHANGE GEAR BOX MOUNTING KIT FOR GROUND DRIVE IMPLEMENT

[75] Inventor: Glen L. Strand, Murdock, Minn.

[73] Assignee: TCI, Inc., Benson, Minn.

[21] Appl. No.: 567,091

[22] Filed: Dec. 30, 1983

[51] Int. Cl.⁴ .............................................. F16H 1/14
[52] U.S. Cl. ......................................... 74/417; 74/13; 74/606 R
[58] Field of Search ......................... 74/417, 13, 606 R

[56] References Cited

U.S. PATENT DOCUMENTS

| | | | |
|---|---|---|---|
| 2,845,807 | 8/1958 | Harless | 192/67 R |
| 3,022,675 | 2/1962 | Trought | 74/417 |
| 3,226,061 | 12/1965 | Dowty et al. | 74/417 |
| 3,503,274 | 3/1970 | Howard | 74/417 |
| 3,977,268 | 8/1976 | Seabrook | 74/417 |
| 4,228,656 | 10/1980 | MacGlashan, Jr. | 74/417 |
| 4,240,256 | 12/1980 | McDougal | 74/417 |
| 4,311,435 | 1/1982 | Bergero | 74/417 |
| 4,476,743 | 10/1984 | Magin | 74/417 |

OTHER PUBLICATIONS

Brochure entitled "Tyler Pull-Type Spreaders", by TCI, Inc., publication date 1980.

*Primary Examiner*—Henry C. Yuen
*Attorney, Agent, or Firm*—Kinney & Lange

[57] ABSTRACT

A quick change gear box mounting kit for a gear box that provides for a drive from a ground drive wheel of an implement to a shaft, includes a mounting that permits the gear box to be selectively coupled in first and second positions wherein different shafts on the gear box comprise input shafts. As shown in one position the output shaft of the gear box provides a 1.5 to 1 reduction in gearing, and by rotating the gear box 90° through the use of the quick couplings and a quick attach mounting of the kit, the gear box can be changed so that the input shaft and output shaft will provide a 1.5 to 1 overdrive between the shaft then used as the input shaft, and the output shaft. The gear box mounting is useful particularly in ground drive mechanisms for apparatus such as inorganic fertilizer spreaders.

9 Claims, 6 Drawing Figures

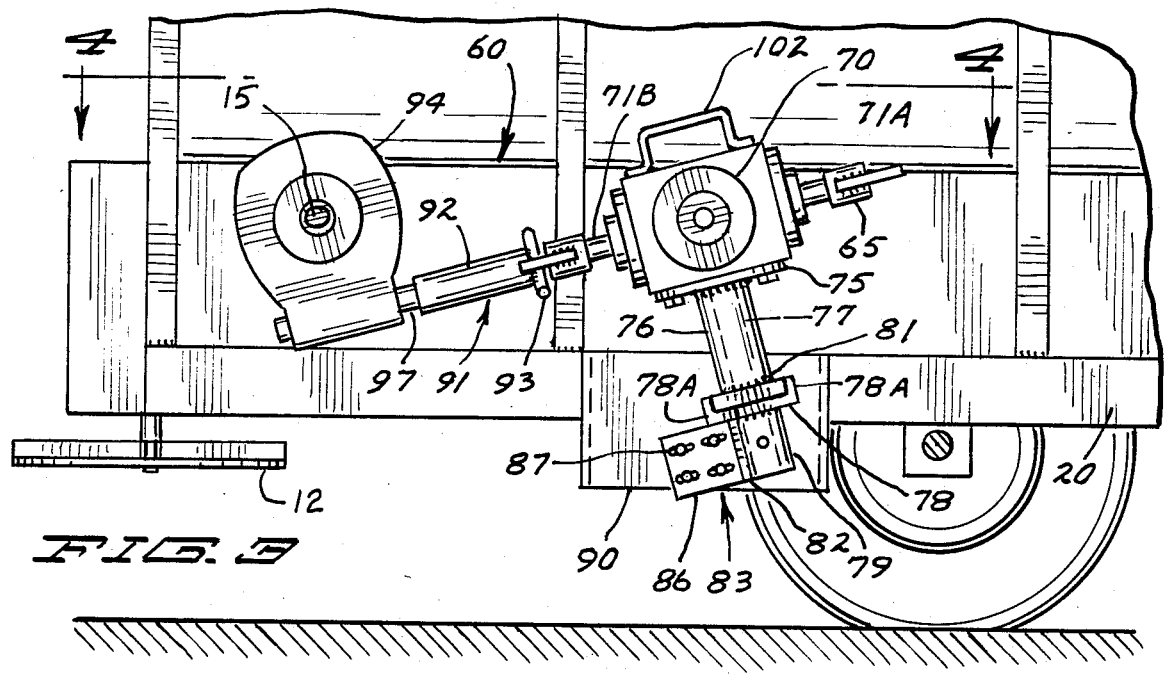
FIG. 3
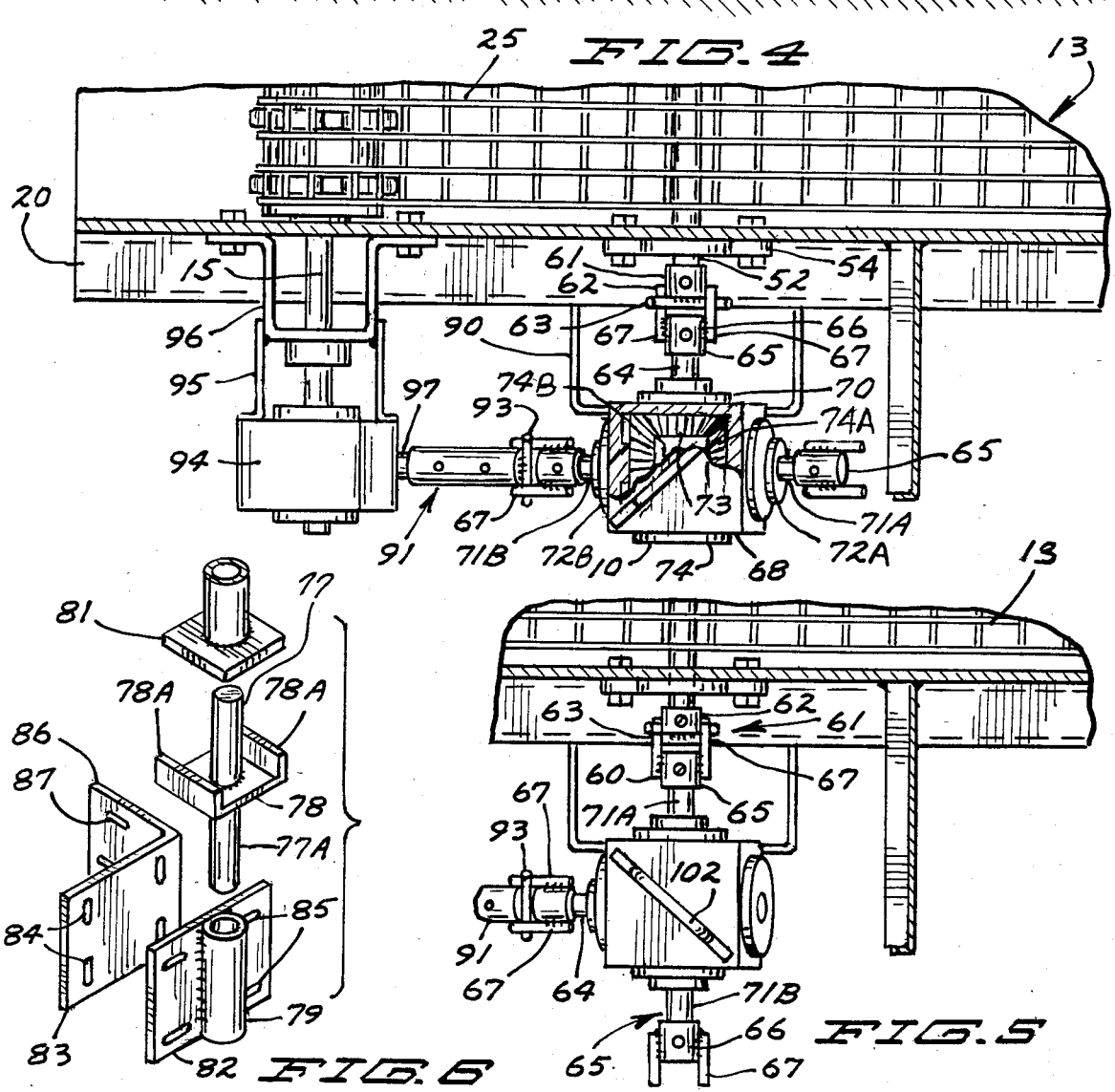
FIG. 4
FIG. 6
FIG. 5

QUICK CHANGE GEAR BOX MOUNTING KIT FOR GROUND DRIVE IMPLEMENT

BACKGROUND OF THE INVENTION

1. Field of the Invention

The present invention relates to a quick change mounting kit for a two speed gear box of a ground drive implement.

2. Description of the Prior Art

Ground drive implements are well known. In particular the bottom chain conveyors in inorganic fertilizer spreaders have long been ground driven. That is, one of the support wheels for the spreader will have a small drive wheel frictionally engaging it, and this drive wheel will be rotated from the engagement with the main support wheel and will in turn drive a shaft that will thus move in proportion to the ground speed of the implement.

To obtain different spreading rates, speed change mechanisms have been used, but at the present time such speed changes use chain drives with selectable different size sprocket sets.

The present invention provides a gear box drive that may be quickly changed from a reduction ratio between the input and the output shafts, to an increase (overdrive) in speed ratio between the input and the output shafts.

SUMMARY OF THE INVENTION

The present invention relates to a gear box mounting and drive kit for ground drive implements. Primarily useful in farm implements where a substantial difference between two speeds of movement of a conveyor chain are desired, such as in inorganic fertilizer spreaders.

The present device is a simple bevel gear box that has internal gearing that provides for a 1.5 to 1 (as disclosed) gear ratio between two right angle shafts. Either shaft is capable of being the input shaft, driven from the ground drive mechanism. The shaft couplings are made to permit easy coupling and uncoupling. Also, the gear box is mounted on a pivot shaft and is retainable in at least two selected positions at 90° to each other. The retaining means is disengaged by lifting the gear box, which lifting is permitted by the drive couplings on the shafts.

If the gear box is connected to provide a reduction ratio between the input and output shafts, upon lifting the gear box from its retained position, as permitted by the quick change drive couplings, and rotating the box 90°, the first output shaft then may be coupled to the ground drive or input, and the first input shaft then becomes the output shaft and a 1.5 to 1 overdrive is obtained.

Two different speed ratios are quickly and easily obtained in the field, with a very simple mechanism, and with a very reliable operation.

BRIEF DESCRIPTION OF THE DRAWINGS

FIG. 3 is a side view of the device of the present invention showing the gear box mounting kit of the present invention and viewed from an opposite side of the fertilizer spreader from FIG. 1;

FIG. 4 is a plan view taken generally along lines of 4—4 in FIG. 3;

FIG. 5 is a view taken on the same line as FIG. 4 with the gear box rotated at 90° to provide an overdrive; and FIG. 6 is a fragmentary exploded view showing the means for mounting the gear box to permit the quick change from one speed to the other.

DETAILED DESCRIPTION OF THE PREFERRED EMBODIMENTS

Figure 1:
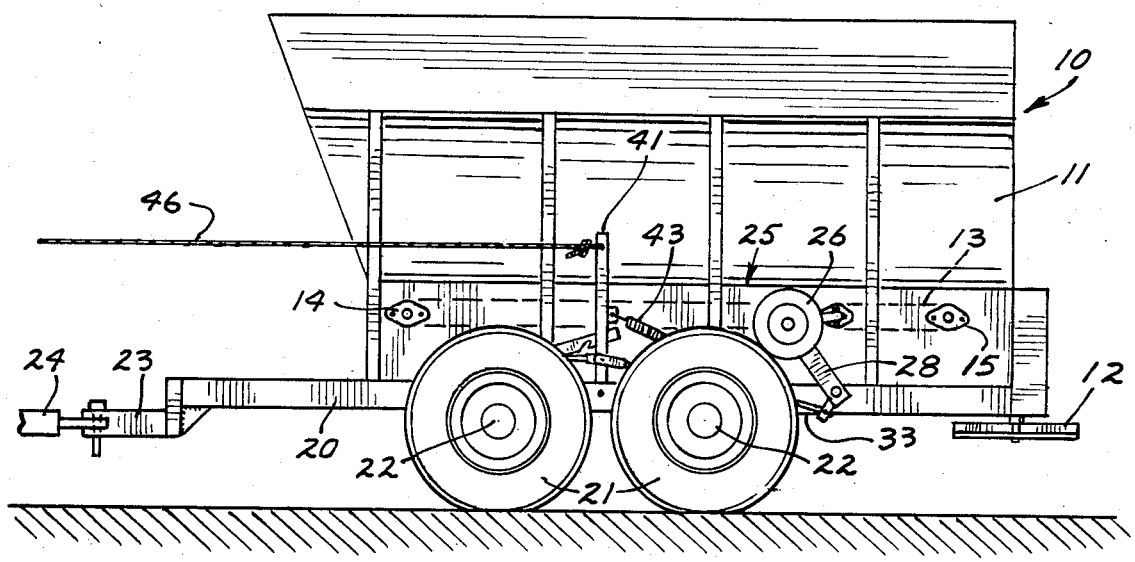
FIG. 1 is a side elevational view of an inorganic fertilizer spreader having a ground drive and a gear box mounting kit made according to the present invention installed thereon.

The typical inorganic fertilizer spreader illustrated generally at 10 comprises a box or hopper 11. A distributor disk assembly 12 is mounted at the rear thereof and is rotated under power about a substantially upright axis to distribute inorganic fertilizer delivered from a conveyor assembly indicated at 13 on the interior of the box 11. The conveyor 13 is mounted on front and rear shafts 14 and 15, respectively, rotatably mounted on the box or hopper in a normal manner. The rear shaft 15 is normally the powered shaft and it is powered through the gear box made and mounted according to the present invention.

The spreader 10 has a frame 20 which is mounted on tandem wheels 21, as shown, mounted on suitable axle assemblies 22, again in a normal manner. The mountings of the axles 22 are shown schematically for illustrative purposes only. The frame 20 has a hitch pole 23 that connects to the hitch of a prime mover 24. The drive for the rear shaft 15 of the conveyor is generally a ground drive arrangement and by that it is meant that the drive is made so that its speed is proportional to the movement of the spreader 10 over the ground.

Figure 2:
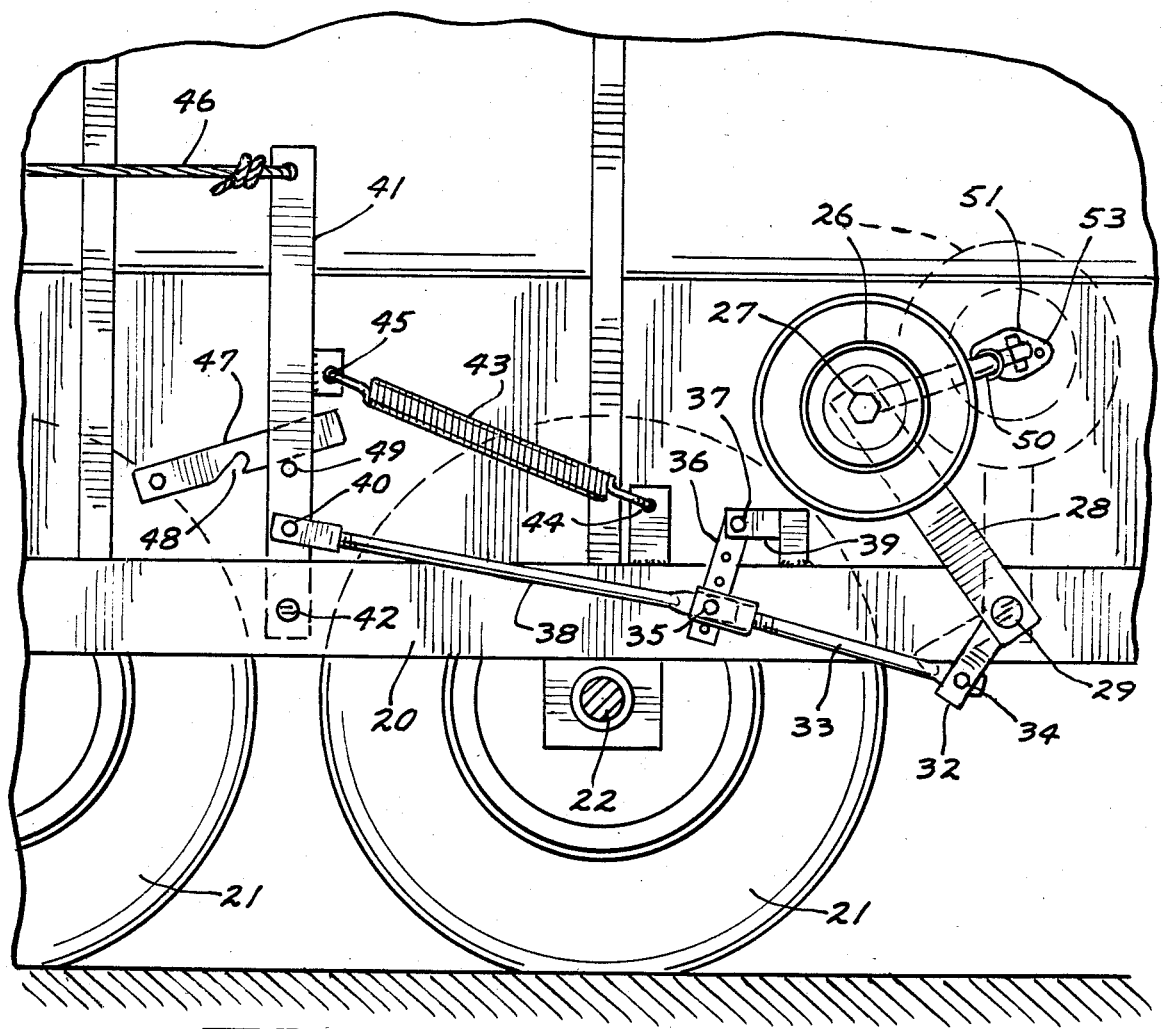
FIG. 2 is an enlarged side view of a typical drive wheel assembly shown in FIG. 1.

A ground drive wheel mounting assembly illustrated generally at 25 in FIG. 1 is shown in greater detail in FIG. 2. In this particular form, a smaller wheel indicated at 26 is rotatably mounted on a shaft 27. Shaft 27 in turn is mounted on an arm 28 that is pivotally mounted on a shaft 29 supported on the frame 20 of the spreader in a desired manner. The shaft 29 is pivotally mounted so that it will move or pivot about a generally horizontal axis. The pivotal position of arm 28 in turn is controlled by a control lever 32 that is fixed to the arm. The control lever 32 is suitably coupled to a link 33. Link 33 is connected at one end to the lever 32 through a connection bolt 34 and at the other end is connected with a bolt 35 to a selected one of a plurality of openings in a crank 36. The crank 36 is pivotally mounted as at 37 to a support 38 that is fixed to the frame 20. The position of the crank 36 about pivot 37 is controlled through a second link 38 connected to the same bolt 35 as the second end of the link 33.

The opposite end of the link 38 is connected as at 40 to a control lever 41. The control lever 41 is pivotally mounted as at 42 with a suitable bolt to the frame 20, and extends upwardly therefrom. A tension spring 43 is connected at one end as at 44 to a bracket that is fixed to the frame 20, and the other end of the spring 43 is connected as at 45 to the control arm 41. When the control arm is released from a latched position, the spring 43 will urge the arm about pivot bolt 42 to load the links 33 and 38 in compression and thus to urge the arm 28 about the pivot of the support shaft 29 so that the rubber tired wheel 26 engages associated support wheel 21 so that there is a friction drive between the wheel 26 and the wheel 21. Each time the wheel 21 rotates, the wheel 26 will also be rotated under frictional forces.

A control rope 46 is shown in FIGS. 1 and 2, and is connected to the upper end of the control arm 41. A suitable latch 47 may be provided for the arm 41. The latch 47 has a latch notch 48 that fits over a provided pin 49 on the control arm 41 so that when the control arm 41 is pulled forwardly enough the notch 48 will fit over the pin and keep the control arm 41 in a position wherein the drive wheel 26 will be moved to position to clear the wheel 21, and move to a position generally shown in dotted lines in FIG. 2.

The axle shaft 27 will thus rotate whenever the wheel 26 is rotating. The inner end of shaft 27 is connected through a universal joint (not shown) to one part of a telescoping drive shaft shown at 50. The telescoping shaft 50 is a shaft that has a square inner shaft, for one section, and an outer square tube that telescopes over the inner shaft. The outer end of the shaft 50 has a universal joint 51 thereon that in turn drives a cross shaft 52 perhaps best seen in FIGS. 4 and 5. Cross shaft 52 is mounted on suitable bearings 53 on the first side of the box or hopper 11 and 54 on the second side of the hopper. Thus, whenever the wheel 26 is rotating, the telescoping drive shaft 50, with universal joints at each end, will drive shaft 52 so that shaft 52 rotates at a rate proportional to the groundspeed of the spreader.

Referring now to FIGS. 3, 4, 5 and 6, which relate to the drive arrangement on the opposite side of the hopper, the drive for the conveyor 13 is indicated generally at 60. This includes components of the drive and mounting kit for a right angle gear box necessary in the final drive. The drive includes a drive coupling indicated at 61 on the output end of the shaft 52. Drive coupling 61 is typical of one part of the couplings that are shown in FIGS. 4, 5, and 6 and includes a hub 62 drivably mounted on shaft 52, and a rod 63 that is welded to the end of the hub and extends perpendicular to the axis of the shaft 52, and thus perpendicular to the axis of rotation of the shaft and the hub. The rod 63 is a hardened rod and extends outwardly beyond the outer surfaces of the hub to provide a driving lug, that is coupled to a driven hub.

The second part of the coupling indicated at 65 comprises a driven hub that is mounted on a shaft 64 of a bevel gear, right angle drive gear box assembly 68. The coupling 65, which may be termed a "female" coupling, comprises a hub 66, which has a pair of hardened rods 67 welded to the outer surface thereof on diametrically opposite sides. The rods 67 are parallel to the axis of the shaft on which the hub 66 is mounted, and thus parallel to the axis of the hub. Both hubs 62 and 65 are drivably mounted on the respective shafts in a suitable manner such as with pins, or keys and keyways. As shown for driving, the rod 63 is positioned within the space between the rods 67, 67, and axially positioned so that as the shaft 52 rotates, rod 63 will bear against the rods 67, 67 and will thus rotate the hub 66 of coupling 65 and rotate shaft 64.

The gear box 68 is a normal three shaft, three gear bevel gear box having right angle drive gears on the interior. Suitable bearings are provided in a bearing housing for a first shaft 64. A second shaft 71A is mounted in the gear box on suitable bearings 72A on a face of the gear box 90° from the shaft 64. A bevel gear 74A is drivably mounted on shaft 71A on the interior of the gear box. The bevel gear 74A meshes with a bevel gear 73 drivably mounted on shaft 64. A third shaft 71B is mounted on bearings 72B on a side of the box facing in opposite direction from the side with shaft 71A. The shaft 71B is co-axial with shaft 71A and 90° to shaft 64. The shaft 71B has a bevel gear 74B drivably mounted thereon, and it meshes with bevel gear 73 also.

The internal gears 74A and 74B have a different number of teeth from the gear 73 on shaft 64. Gears 74A and 74B as can be seen are the larger gears. In the preferre,d embodiment, the gears 74A and 74B will have 1½ times as many teeth as the gear 73.

Each of the outer end portions of shafts 71A and 71B, which extend out the opposite sides of the gear box, has a second coupling 65 mounted thereon. The second couplings 65 on the ends of shafts 71A and 71B are the same as on the shaft 64 and form female couplings having the two spaced drive rods 67, extending parallel to the shaft.

The gear box 68, as can perhaps be seen in FIGS. 3 and 6, is mounted on a pedestal that forms part of the mounting kit and includes a plate 75 at the top end thereof which is then bolted to the bottom of gear box 68 in a normal manner. Plate 75 has a sleeve 76 fixed thereon which has an axis perpendicular to the plane of the shafts 64, 71A and 71B, (and to plate 75) and extends downwardly from the gear box. This sleeve 76 is of size to slidably fit over a tube or shaft 77, which has a U-shaped or channel shaped latch bracket 78 fixed thereon. The shaft 77 extends downwardly below the bracket 78 with a portion 77A that is slidably received in a sleeve 79. The shaft 77 is fixed in rotational position with respect to the sleeve 79 through the use of suitable set screws or a pin. The sleeve 76 has a latch lug plate 81 welded thereto in the center portions spaced from plate 75, and also spaced from the lower end of sleeve 76, which fits within the upright legs 78A of the channel shaped bracket 78. Therefore when the gear box is in position with the latch lug 81 (which is square) positioned between the legs 78A, the gear box cannot rotate relative to the shaft 77.

When the gear box 68 is raised, however, to a position wherein the lug 81 clears the legs 78A as shown in dotted lines in FIG. 3, the gear box 68 can be rotated about the shaft 77. The latch portions, namely the bracket 78 and lug 81 may be disengaged to permit sleeve 76 to rotate.

Mounting sleeve 79 is mounted to a plate 82 which is bolted onto one leg of an L-shaped bracket 83. The leg of bracket 83, as shown, has slots 84 running in a vertical direction, and the plate 82 has aligning slots running in a horizontal direction. The slots 85 mate with the slots 84, and suitable bolts are then used for clamping the plate 82 and the respective leg of bracket 83 together. The slots 84 and 85 provide for adjustment in two directions. As shown a second leg of bracket 83, which is indicated at 86, has slots 87 thereon that mate with suitable slots in a bracket 90 that is fixed to the frame 20 of the spreader. These slots on leg 86 and bracket 90 permit adjustment, and by adjusting the position of the brackets appropriately, alignment can be made for the gear box in all directions.

As shown in FIG. 3, end portion 71B of shaft 71 has a coupling 65 thereon, and this in turn is positioned to drive a coupling of a second type indicated generally at 91 which is similar in construction to the coupling 61. Coupling 91 includes a sleeve 92 which has a rod 93 welded at the end thereof perpendicular to the axis of the sleeve or hub 92. The rod 93 is positioned between the rods 67 of the coupling 65 on the end portion 71B of cross shaft 71 of the gear box. Rotation of the coupling 65 as shaft 71 rotates will cause the rods 67 to engage the cross rod 93 and rotate the hub 91.

Hub 91 is mounted on an input shaft 97 of a worm gear box 94. The worm gear box has a relatively high reduction ratio, for example at 15 to 1, and is suitably mounted on the frame. For example, brackets 95 bolted to the box can be supported on a second bracket 96 that is bolted to the side member of the frame 20. The output gear of gear box 94 has a bore which is mounted on the conveyor shaft 15 (shown in FIG. 3) which drives the conveyor. The shaft 15 is the rear conveyor shaft for driving the conveyor member 13, which as shown is a mesh type belt of conventional design used with inorganic fertilizer spreaders. Therefore, whenever the wheel 26 is rotating, and shaft 52 is rotating, the gear box 68 will be driven through one or another of the shafts. In the form in FIG. 4, the shaft 64 is driven by the shaft 52 through couplings 61 and 65. Shaft 64 then drives the shaft 71B through the internal gears at a reduction of 1.5 to 1. The coupling 65 on the outer end of shaft 71B will drive the hub 91 on the input shaft 97 of the worm gear box at a rate that is proportional to the groundspeed, but at a first gear ratio.

If the higher speed of the conveyor chain 13 is desired for operation, the gear box ratio is readily changed. The gear box 68 has a handle 102 at the top thereof, and the gear box shafts will be oriented or timed so that the coupling 65 on the shaft 64 and couplings 65 on the ends of the shaft 71 are synchronized. The drive rods 67 will all lie in a common plane coinciding with the plane of shafts 64 and 71 in at least one rotational position. The wheel 26 should be disengaged so the shafts of the gear box 68 can be rotated by hand to move the shafts to position so the rods 67 can be disengaged from the rods 63 and 93, respectively, as the gear box is lifted. With the rods 63 and 93 generally upright the gear box can be lifted with the handle 102 so that the sleeve 76 slides along the shaft 77 and the latch lug 81 will be lifted out to clear the legs 78A of the latch bracket 78. The gear box 68 then can be rotated 90° while guided by sleeve 76 on shaft 77, to the position shown in FIG. 5. The coupling 65 on the shaft portion 71A will then be aligned with and will engage the coupling 61 on the shaft 52, and the coupling 65 on the shaft 64 will engage and be drivably aligned with the coupling 91 on the input shaft 97 of the worm gear box 94. By dropping the gear box down into position so that the latch lug 81 again fits between the legs 78A (the edges of the lug 80 which are 90° to the previous latch edges) the unit is ready to be used.

The drive wheel 26 of course can be engaged at any desired time by operating the rope pull in a conventional manner. Rope pulls have long been used for engaging the ground drives in such fertilizer spreader trailers.

The combination of the simplified drive couplings that permit the gear box to be lifted, as well as the latch bracket and lug that cooperate to fix the gear box position, but which permit easy disengagement of the latch to rotate the gear box, cooperates to provide a reliable quick change gear box for getting two different gear ratios to drive the conveyor belt on a fertilizer spreader. The gear box mounting and couplings can easily be adapted for use on other ground drive arrangements where two different gear ratios are desired.

Drive couplings of other designs may be used as well. The two members of each coupling assembly should be separable simultaneously in at least one position of the gears in box 68 to permit the shaft 70 and sleeve 76 to move for releasing the latch parts for the 90° indexing rotation of the gear box.

Although the present invention has been described with reference to preferred embodiments, workers skilled in the art will recognize that changes may be made in form and detail without departing from the spirit and scope of the invention.

What is claimed is:

1. A gear box mounting for a bevel gear box having first and second selectively driven shafts at 90° to each other and lying on a first plane, which shafts rotate at a different ratio when one or the other of the shafts is driven, comprising first and second telescoping members capable of rotation relative to each other about an axis and being movable to telescope along the axis, a gear box support on one of said telescoping members to support a gear box with the first axis perpendicular to the first plane of a supported gear box, means to mount a second of said telescoping members in position on a machine to position a gear box on the gear box support to form a drive through such a gear box mounted to the gear box support between two shafts on a machine on which the mounting is placed, and cooperating releasable latch means on the telescoping members engageable at first and second different rotational positions of the telescoping members at 90° to each other to prevent rotation of the telescoping members relative to each other in each position, a gear box supported on the gear box support being retained in position to have its shafts drivably coupled to two shafts on a machine on which the telescoping members are supported, said latch means being released when a supported gear box is manually lifted to telescope the telescoping members along the axis from the first position to permit rotation of a supported gear box to the second position of the telescoping members with a supported gear box in a second position positioned for coupling to shafts of a machine on which the support is mounted.

2. The combination as specified in claim 1 wherein said latch means comprises a substantially flat plate on one member having a rectilinear configuration and a bracket on the other member having a leg that engages the side edges of said plate in at least two different positions rotated 90° from each other.

3. The apparatus specified in claim 1 in combination with coupling members adapted to be mounted on two shafts on a machine and two shafts on a gear box and such coupling members having at least one position wherein they can be disengaged by moving the gear box carrying such coupling members to unlatch the latch means.

4. The apparatus of claim 3 wherein one of the coupling members comprises a hub, a pair of pins mounted on the hub generally parallel to the axis of the gear box and diametrically spaced apart from each other, said pins extending outwardly to form a space therebetween and being spaced to receive a rotary drive member between the pins to effect a rotary drive when the drive member is rotated.

5. The apparatus specified in claim 4 wherein said drive member comprises a hub having a drive rod at 90° to the axis of rotation of the hub, said drive rod fitting between the pins on said one member.

6. A support and drive kit for a ground drive apparatus for a mobile vehicle having a first shaft rotationally driven in response to the ground speed of the implement, and a second shaft to be driven positioned at substantially 90° to said first shaft adjacent to one end of said first shaft and including a right angle drive gear box having third and fourth right angle shafts with axes forming a plane, said third and fourth shafts being adapted to be connected between the first and second shafts, the kit improvement comprising a gear box support and drive coupling kit for a gear box to be connected between the one end of the first shaft and the adjacent end of the second shaft, including first drive member couplings for drivably mounting on the first and second shaft ends, second drive couplings for mounting on the right angle shafts, means on each of the first couplings engageable with a second coupling to effect a rotational drive between the right angle shafts and first and second shafts on which respective first and second couplings are mounted, said first and second couplings each being movable, when mounted on their respective shafts to at least one rotational position wherein the first and second coupling members will separate upon movement along an axis substantially perpendicular to the plane of the right angle shafts, and said kit including a support assembly for a gear box with which the couplings are to be used having first and second telescoping movement, a gear box support on one of the telescoping members to support a gear box having right angle shafts with the plane of such shafts substantially perpendicular to the telescoping axis, means to mount a second of said telescoping members to a mobile vehicle to position the gear box support at a desired position, and cooperating latch means to releasably latch the telescoping members with respect to each other at two rotational positions 90° to each other.

7. The apparatus of claim 6 wherein the latch means are releasable upon relative movement of the telescoping members in direction along the longitudinal axis.

8. The apparatus of claim 6 and means to permit adjustment of the means to mount relative to the mobile vehicle.

9. A support and drive kit for a ground drive apparatus for a mobile vehicle having a first shaft rotationally driven in response to the ground speed of the implement, and a second shaft to be driven positioned at substantially 90° to said first shaft adjacent to one end of said first shaft and including a right angle drive gear box having third and fourth right angle shafts with axes forming a plane said third and fourth shafts being adapted to be connected between the first and second shafts, the kit improvement comprising a gear box support and drive coupling kit for a gear box to be connected between the one end of the first shaft and the adjacent end of the second shaft, including first drive member couplings for drivably mounting on the first and second shaft ends, second drive couplings for mounting on the right angle shafts, means on each of the first couplings engageable with a second coupling to effect a rotational drive between the right angle shafts and first and second shafts on which respective first and second couplings are mounted, said first and second couplings each being movable, when mounted on their respective shafts to at least one rotational position wherein the first and second coupling members will separate upon movement along an axis substantially perpendicular to the plane of the right angle shafts, and said kit including a support assembly for a gear box with which the couplings are to be used having the first and second telescoping movement, a gear box support on one of the telescoping members to support a gear box having right angle shafts with the plane of such shafts substantially perpendicular to the telescoping axis, means to mount a second of said telescoping members to a mobile vehicle to position the gear box support at a desired position, and cooperating latch means to releasably latch the telescoping members with respect to each other at two rotational positions 90° to each other, wherein the latch means comprises a rectilinear periphery plate on one member, and a bracket having at least one leg that extends perpendicular to the plate and closely fits along one edge thereof.

* * * * *